United States Patent [19]

Smith et al.

[11] Patent Number: 5,030,405

[45] Date of Patent: Jul. 9, 1991

[54] SOAP SAVING METHOD AND APPARATUS

[76] Inventors: Bruce K. Smith, 915 Michele Ct., Landover, Md. 20786; Levonia Jones, 3814 Swann Rd., Suitland, Md. 20746

[21] Appl. No.: 553,259

[22] Filed: Jul. 16, 1990

[51] Int. Cl.[5] .......... B29C 33/38

[52] U.S. Cl. .......... 264/219; 249/141; 264/DIG. 069; 425/195; 425/318

[58] Field of Search .......... 425/318, 189, 195, 84, 425/86; 252/92; 264/DIG. 69, 219, 37, 86; 249/141

[56] References Cited

U.S. PATENT DOCUMENTS

| | | | |
|---|---|---|---|
| D. 190,405 | 5/1961 | Barnes | 425/318 |
| 2,168,389 | 8/1939 | Bemis | 425/84 |
| 2,250,697 | 7/1941 | Bassett | 425/86 |
| 2,380,892 | 7/1945 | White | 425/318 |
| 4,035,122 | 7/1977 | Cavanaugh | 425/84 |
| 4,917,589 | 4/1990 | Manderson | 425/318 |

*Primary Examiner*—Jan H. Silbaugh
*Assistant Examiner*—Brian J. Eastley
*Attorney, Agent, or Firm*—Leon Gilden

[57] ABSTRACT

A method and apparatus for combining soap segments, including providing a soap mold member formed with complementarily configured shells defining an internal cavity therewithin securable to an elongate handle to secure soap segments therewithin. The shells include apertures directed therethrough, whereupon positioning a plurality of soap segments within the cavity, the mold is positioned within a container. The container includes a sponge core defining a central cavity defined by a diameter substantially equal to that defined by the shells when secured together. The sponge core is saturated with water prior to insertion of the mold therewithin to permit continuous moistening of the segments contained within the mold when positioned within the cavity. The soap from the mold may be further directed within a press, wherein the press includes an upper and lower lid, wherein the soap portions are positioned within the press upon lifting of the upper lid and resecurement thereof relative to the container. Subsequently, a concave plate is lowered to produce a soap bar that is removable through the bottom lid of the container.

3 Claims, 5 Drawing Sheets

PRIOR ART

SOAP SAVING METHOD AND APPARATUS

BACKGROUND OF THE INVENTION

1. Field of the Invention

The field of invention relates to soap forming organizations, and more particularly pertains to a new and improved soap saving method and apparatus wherein the same recombines barious soap segments to form a single soap bar.

2. Description of the Prior Art

The reclaiming and recombining of various soap segments to minimize waste of such portions has been attempted in the prior art. For example, U.S. Pat. No. 4,035,122 to Cavanaugh sets forth a soap saving device wherein a container utilizes a plurality of inserts to secure and mold a soap within a lower portion of the container.

U.S. Pat. No. 4,030,867 to Everman provides an apparatus for forming a bar of soap, wherein a weight sensor deposits a predetermined quantity of soap and melts such soap and directs the mold and soap into an underlying mold.

U.S. Pat. No. 4,781,564 to Cerrone provides a soap reforming structure wherein a grinding organization grinds the soap components and directs the thusly ground soap into a lower portion of a press construction.

U.S. Pat. No. 436,818 to Wiatt sets forth a plurality of bolt halves mounted upon opposed handles that are pivotally secured relative to one another for defining a mold apparatus.

As such, it may be appreciated that there continues to be a need for a new and improved soap saving method and apparatus wherein the same addresses both the problems of ease of use as well as effectiveness in construction and in this respect, the present invention substantially fulfills this need.

SUMMARy OF THE INVENTION

In view of the foregoing disadvantages inherent in the known types of soap molding apparatus now present in the prior art, the present invention provides a soap saving method and apparatus wherein the same utilizes various soap segments within a manipulated apparatus to form a soap bar. As such, the general purpose of the present invention, which will be described subsequently in greater detail, is to provide a new and improved soap saving method and apparatus which has all the advantages of the prior art soap forming organizations and none of the disadvantages.

To attain this, the present invention provides a method and apparatus for combining soap segments, including providing a soap mold member formed with complementarily configured shells defining an internal cavity therewithin securable to an elongate handle to secure soap segments therewithin. The shells include apertures directed therethrough, whereupon positioning a plurality of soap segments within the cavity, the mold is positioned within a container. The container includes a sponge core defining a central cavity defined by a diameter substantially equal to that defined by the shells when secured together. The sponge core is saturated with water prior to insertion of the mold therewithin to permit continuous moistening of the segments contained within the mold when positioned within the cavity. The soap from the mold may be further directed within a press, wherein the press includes an upper and lower lid, wherein the soap portions are positioned within the press upon lifting of the upper lid and resecurement thereof relative to the container. Subsequently, a concave plate is lowered to produce a soap bar that is removable through the bottom lid of the container.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved soap saving method and apparatus which has all the advantages of the prior art soap forming organizations and none of the disadvantages.

It is another object of the present invention to provide a new and improved soap saving method and apparatus which may be easily and efficiently manufactured and marketed.

It is a further object of the present invention to provide a new and improved soap saving method and apparatus which is of a durable and reliable construction.

Still yet another object of the present invention is to provide a new and improved soap saving method and apparatus which provides in the apparatuses and methods of the prior art some of the advantages thereof, while simultaneously overcoming some of the disadvantages normally associated therewith.

Still another object of the present invention is to provide a new and improved soap saving method and apparatus wherein the same utilizes a plurality of soap segments to form soap bars or components for reuse thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE pREFERRED EMBODIMENT

Figure 1:
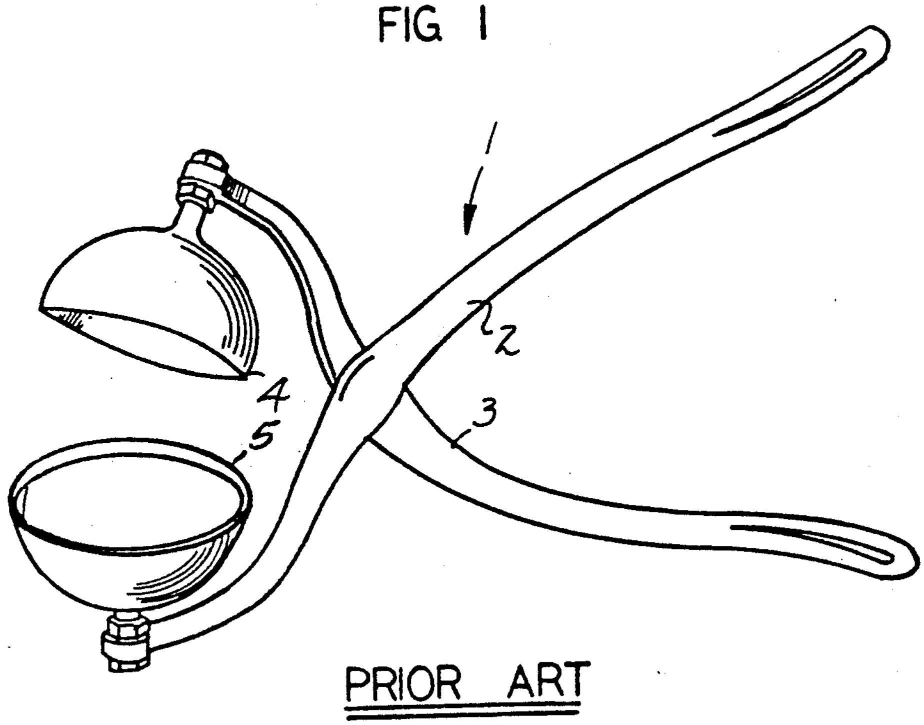
FIG. 1 is an isometric illustration of a prior art mold apparatus.

With reference now to the drawings, and in particular to FIGS. 1 to 9 thereof, a new and improved soap saving method and apparatus embodying the principles and concepts of the present invention and generally designated by the reference numerals 11–35 will be described.

Figure 2:
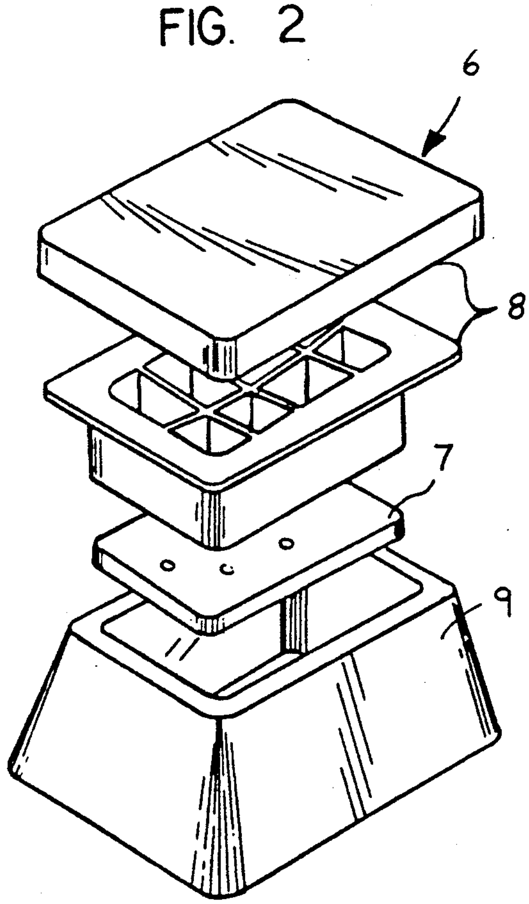
PRIOR ART FIG. 2
FIG. 2 is an isometric illustration of a further prior art mold apparatus for molding soap portions.
Figure 3:
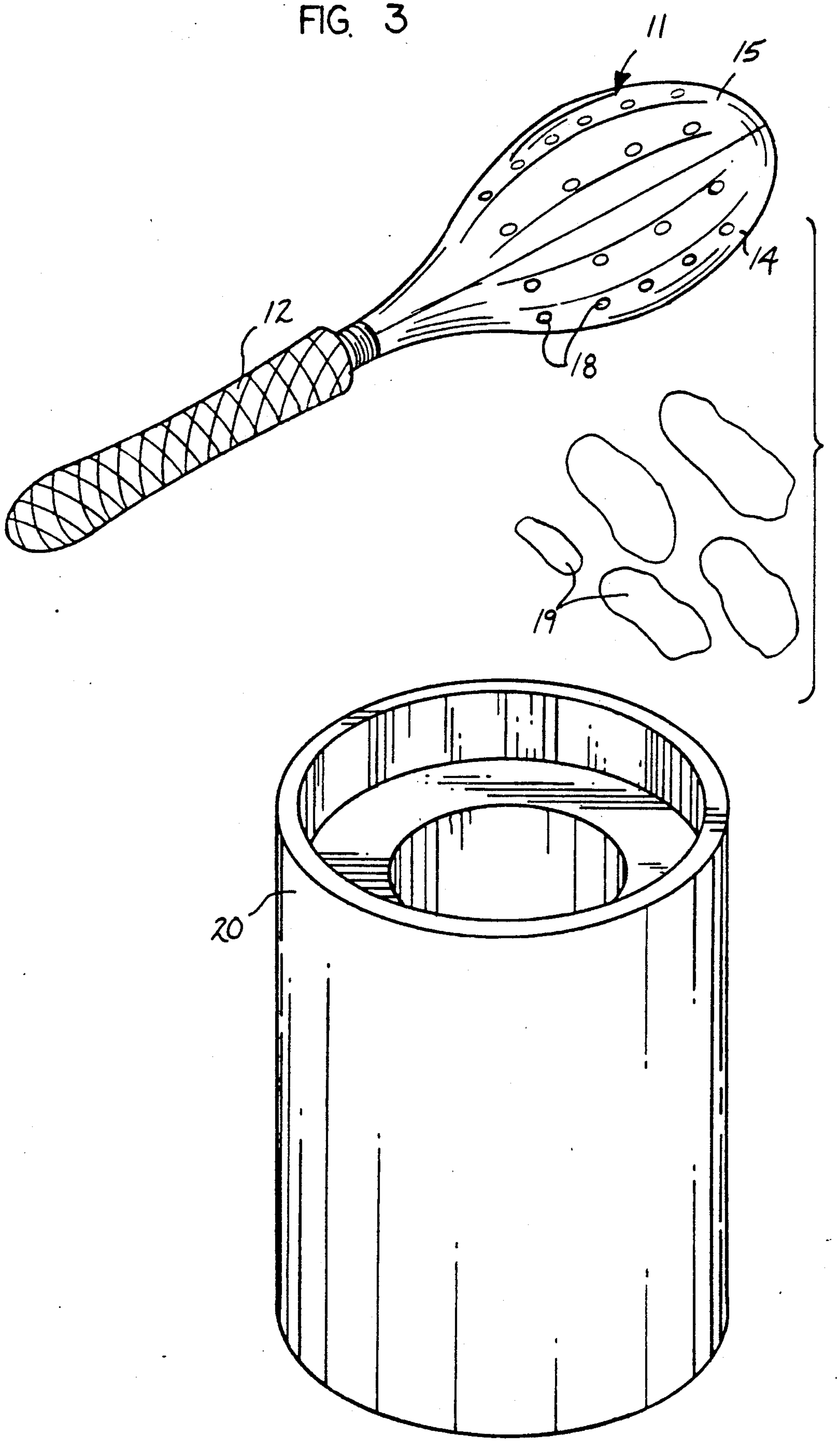
FIG. 3 is an isometric illustration of the instant invention.

FIG. 1 illustrates a prior art mold construction wherein an upper mold 4 is cooperative with a lower mold 5 mounted to pivotally mounted handles 2 and 3 to form a mold component therewithin, such as set forth in U.S. Pat. No. 436,818 for forming popcorn balls. FIG. 2 illustrates a prior art mold apparatus 6, wherein an underlying container 9 utilizes an apertured plate 7 and upper positioning members 8 to form a soap bar within a lower portion of the container 9.

Figure 4:
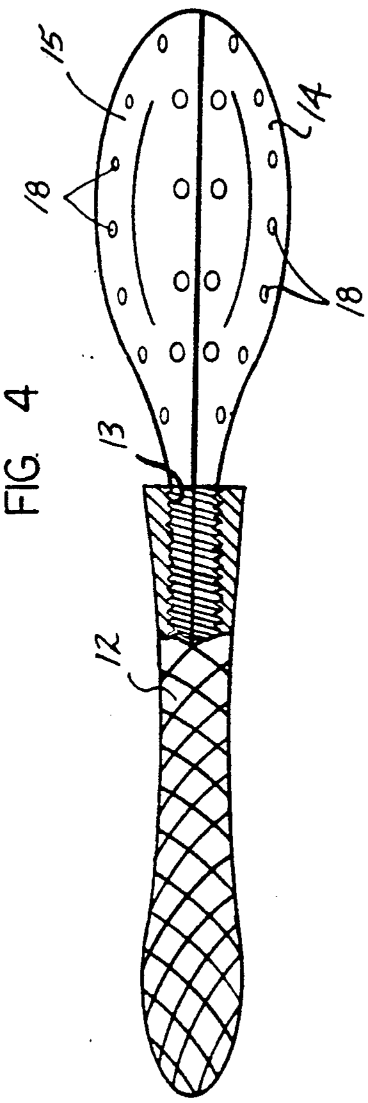
FIG. 4 is an isometric illustration, partially in section, of the mold structure utilized by the instant invention.
Figure 5:
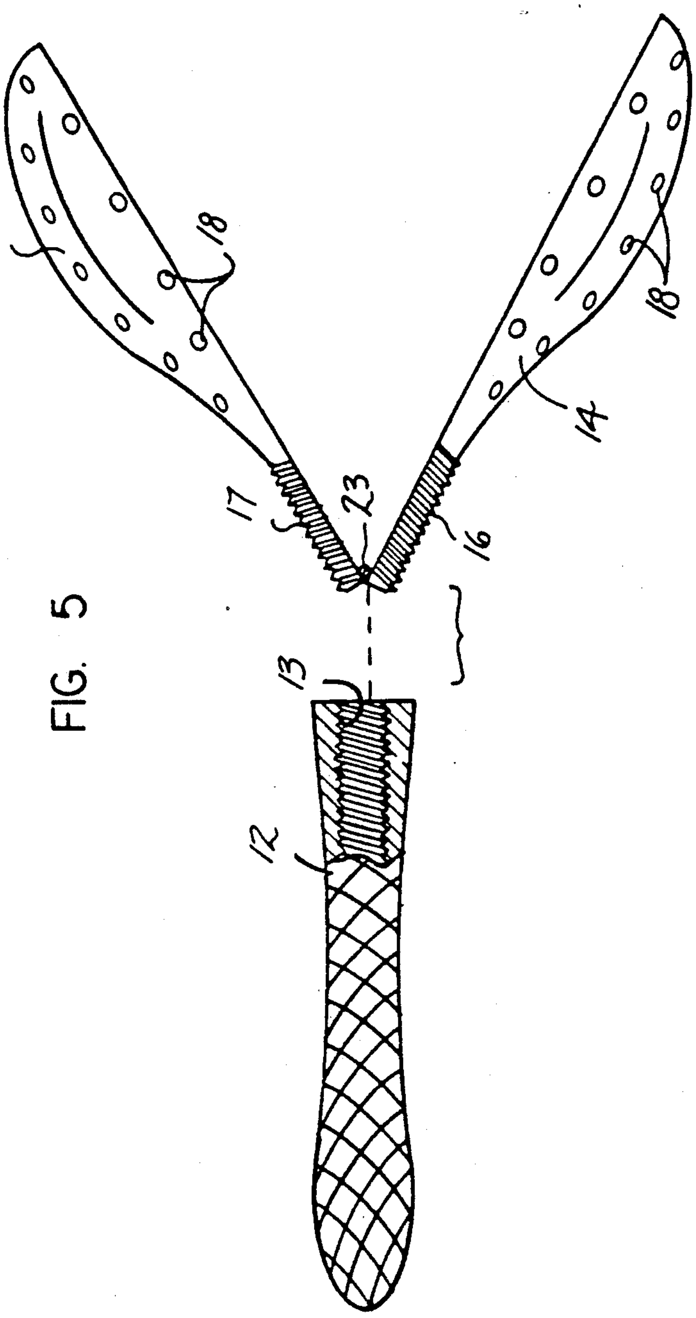
FIG. 5 is an orthographic view, partially in section, of the mold apparatus in a separated orientation.
Figure 6:
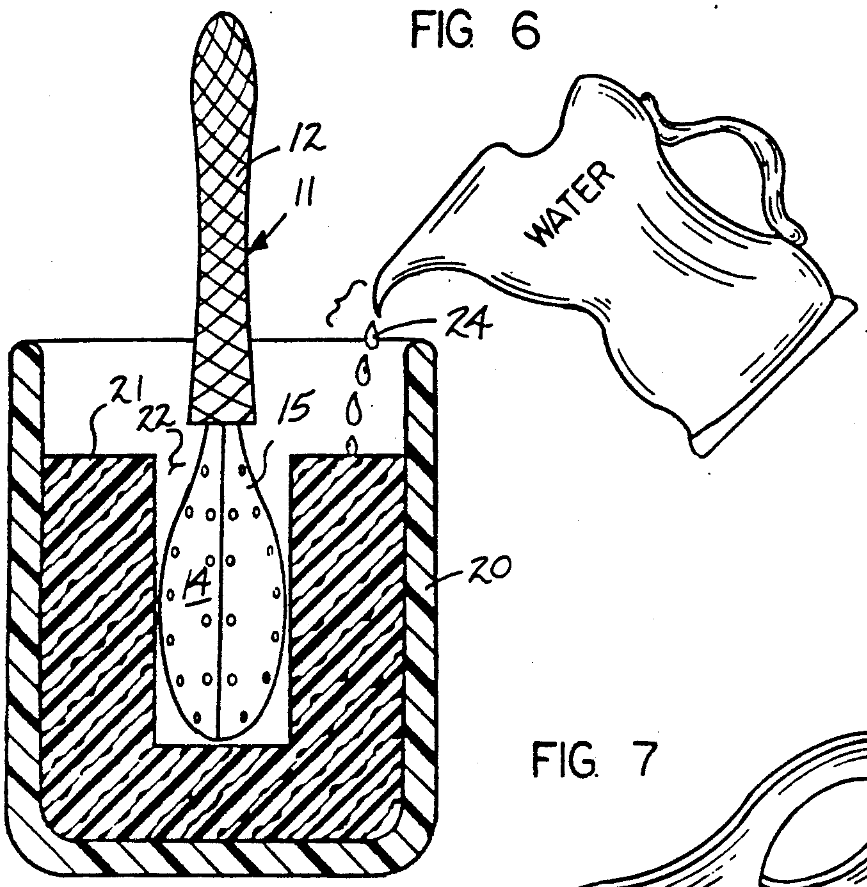
FIG. 6 is an orthographic view, partially in section, of the instant invention illustrating the application of water into the container utilized by the instant invention.
Figure 7:
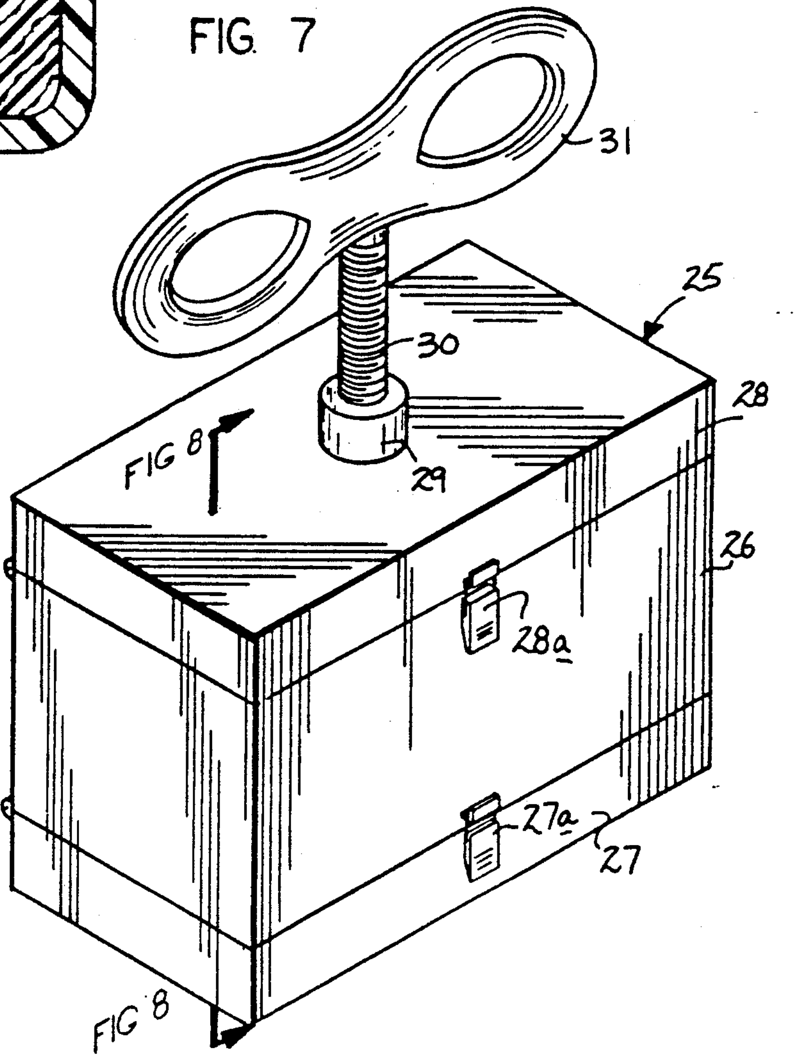
FIG. 7 is an isometric illustration of the soap press organization utilized by the instant invention.
Figure 8:
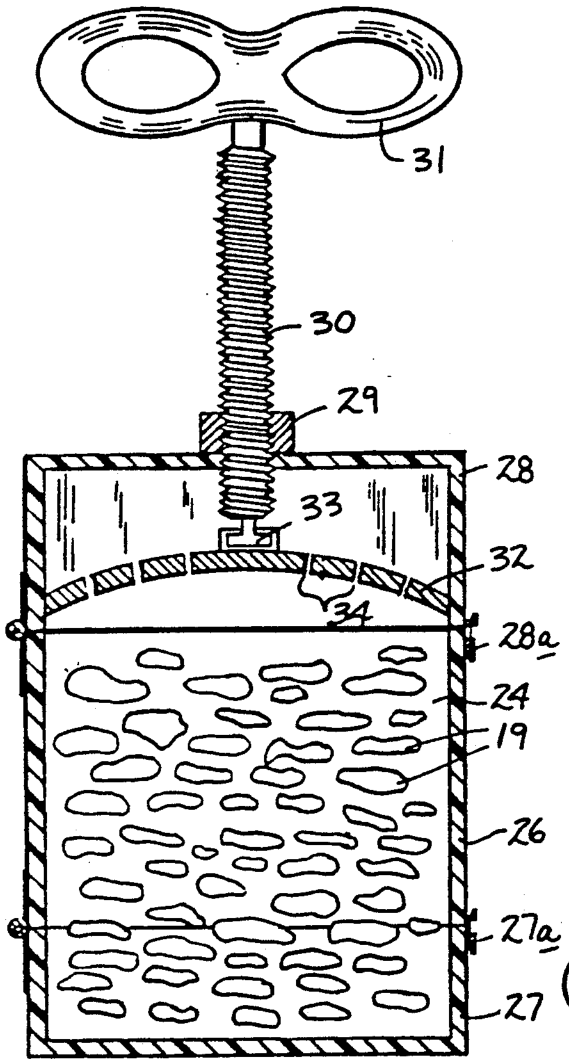
FIG. 8 is an orthographic view, taken along the lines 8—8 of FIG. 7, in the direction indicated by the arrows.
Figure 9:
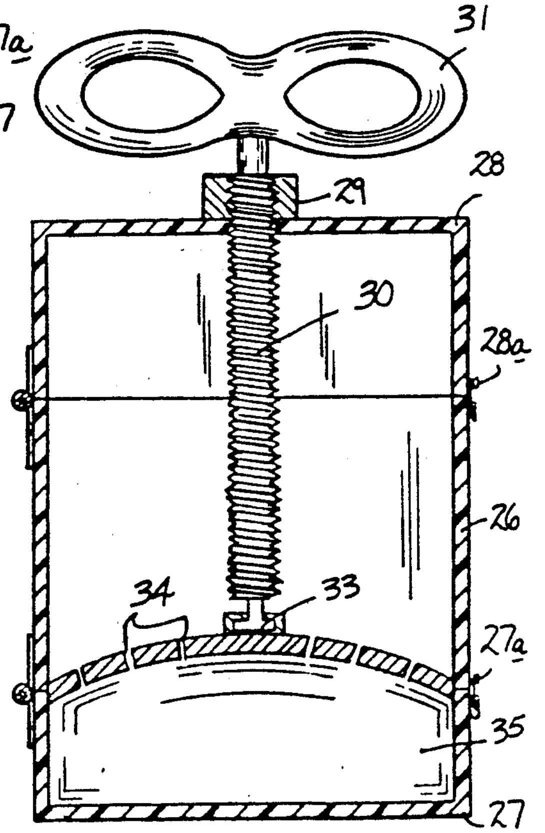
FIG. 9 is an orthographic cross-sectional view of the press as set forth in FIG. 8 in a lowered orientation.

More specifically, the soap saver method and apparatus of the instant invention essentially comprises a soap saving mold 11, including an elongate longitudinally aligned handle 12, with an internally threaded bore 13 directed coaxially of the handle from a forward end thereof. A lower shelf 14 is hingedly mounted to an upper shell 15 at terminal ends thereof by a hinge 13. The upper and lower shells define concave cavities therewithin to define a central cavity. The lower shell 14 includes a semicylindrical externally threaded lower shank 16 cooperative with a semi-cylindrical upper shank 17 coaxially formed to the upper shell 15, wherein the lower and upper shells 16 and 17 respectively are positionable together subsequent to positioning of a plurality of soap segments 19 within the aforenoted cavity for securement to the handle 12, in a manner as illustrated in FIGS. 4 and 5. A matrix of apertures 18 are directed through the lower and upper shells 14 and 15 to permit drainage of excess fluid therefrom. Subsequent to the securement of a plurality of soap segments 19 within the cavity of lower and upper shells, the lower and upper shells when secured together are directed within a container 20. The container 20 includes a sponge core 21 defining a cylindrical cavity 22 coaxially directed through the sponge core. A predetermined quantity of water 24 is directed into the sponge core to saturate the sponge core, whereupon the lower and upper shells 14 and 15 are positioned within the cylindrical cavity 22 to permit directing of moisture into the cavity to permit the soap segments 19 contained therewithin to adhere together to form a single soap segment product. The soap segment product may be utilized individually or positioned subsequently within an associated soap press 25, as illustrated in FIG. 7.

The soap press 25 includes a central body 26 formed with a hingedly mounted lower lid 27 and a hingedly mounted upper lid 28. The respective lower and upper lids 27 and 28 are securable within the central body by respective lower and upper clasps **27*a* and 28*a*. The upper lid 28 includes a support boss 29 that is internally threaded to threadedly receive an externally threaded rod 30. The externally threaded rod 30 includes a handle 31 orthogonally mounted to an upper end thereof, with a concave plate 32 mounted to a lower terminal end of the externally threaded rod 30, including a rod swivel foot connection 33 to permit relative rotation of the threaded rod 30 relative to the concave plate 32. Upon positioning of a predetermined quantity of water 24 and soap segments and the like within the central body 26, the externally threaded rod 30 is rotated to project the concave plate 32 downwardly, wherein the soap segments are compressed against the lower lid 27 to define a finished product as a soap bar 35. The soap bar 35 is removable by unlatching the lower clasp 27*a* for convenient removal of associated moisture and the soap bar 35 relative to the soap press 25. As illustrated, the concave plate 32 includes a matrix of plate openings 34 directed therethrough to permit excess moisture to be directed through the concave plate to direct pressure onto the soap segments to create the soap bar 35** as illustrated.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of molding soap bars from left-over soap segments comprising the steps of, providing a soap mild' including an elongate handle, the elongate handle including an internally threaded bore, and including a lower shell and an upper shell hingedly mounted together, and the lower shell and upper shell including a respective upper and lower semi-cylindrical shank, and positioning a plurality of soap segments within the lower shell and subsequently lowering the upper shell thereover, and wherein the upper and lower semi-cylindrical threaded shanks are secured together to define a threaded shank, and threadedly directing the threaded shank into the internally threaded bore, and further providing a container, positing the soap mold within the container, and further including the step of forming said container with a sponge core and forming the sponge core with a coaxially aligned cylindrical cavity, and saturating the sponge core with water, and forming the cylindrical cavity to define a predetermined diameter equal to a predetermined width defined by the lower and upper shells when secured together, and further including the steps of positioning the soap mold within the cylindrical cavity with the upper and lower shell positioned within the cylindrical cavity in a vertical orientation to permit securement of the soap segments within the soap mold together.

2. A method as set forth in claim 1 further including the step of providing a soap press, and forming the soap press with a central body, and a lower lid hingedly mounted to a lower terminal end of the central body, and forming an upper lid hingedly mounted to an upper end of a central body, and providing a lower clasp to selectively secure the lower lid to the central body, and providing an upper clasp to selectively secure the upper lid to the central body, and forming an internally threaded support boss fixedly on the upper lid, and positioning an externally threaded rod to threadedly engage a support boss with a lower terminal end of the threaded rod formed with swivel connection, and mounting a plate to the swivel connection, and mounting a handle to the upper terminal end of the threaded rod, and filling the central body with water and soap segments from the soap mold, and securing the upper lid to the central body, and rotating the threaded rod to project the plate downwardly, and compressing the soap segments to form a soap bar within the lower lid.

3. A method as set forth in claim 2 further including a step of delatching the lower clasp and lowering the lower lid relative to the central body and subsequently removing the soap bar from the lower lid.

* * * * *